Dec. 29, 1931.    E. W. KELLOGG    1,839,037

SOUND FILM APPARATUS

Filed April 13, 1931

Inventor:
Edward W. Kellogg,
by Charles W. Tullar
His Attorney.

Patented Dec. 29, 1931

1,839,037

UNITED STATES PATENT OFFICE

EDWARD W. KELLOGG, OF MOORESTOWN, NEW JERSEY, ASSIGNOR TO GENERAL ELECTRIC COMPANY, A CORPORATION OF NEW YORK

SOUND FILM APPARATUS

Application filed April 13, 1931. Serial No. 529,692.

My invention relates to sound film apparatus and more particularly apparatus by which sound is reproduced from a film record. The object of my invention is the provision of improved apparatus of this character for supporting a record film and for directing a light beam therethrough and toward a light translating device.

My invention will be better understood from the following description taken in connection with the accompanying drawings, and its scope will be pointed out in the appended claims.

Figure 1:
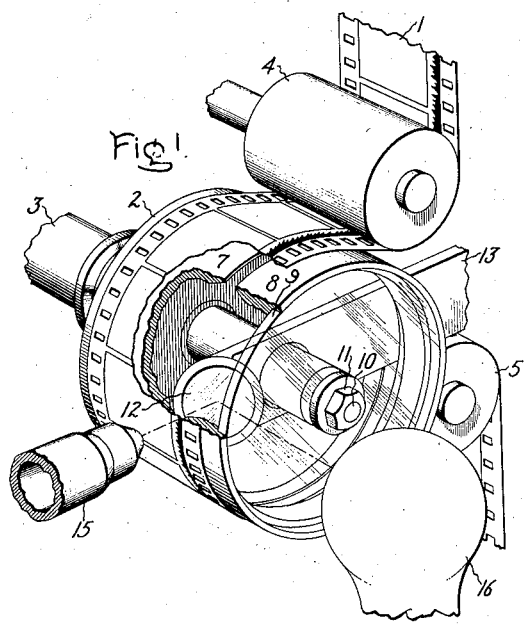
Figure 2:
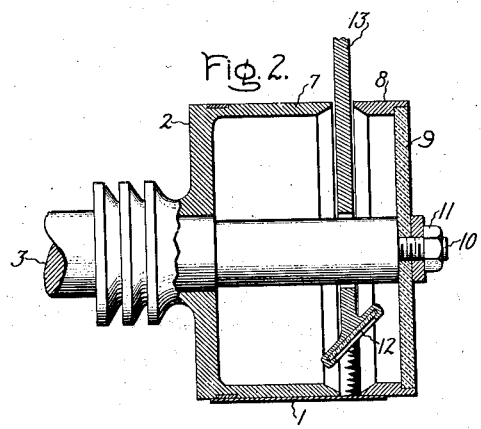

Referring to the drawings, Fig. 1 is a perspective view of one embodiment of my invention and Fig. 2 is a longitudinal cross-sectional view thereof.

In the drawings I have shown at 1 a film of the motion picture type having thereon both picture and sound records. At the point where the sound record is to be converted into electrical impulses the film is supported upon the drum 2 which is carried at the end of shaft 3. For causing the film to have a large angle of wrap about the drum the film is passed over the guide rollers 4 and 5. As more clearly shown in Fig. 2 the drum has a two-part construction comprising inner and outer portions 7 and 8 respectively, which portions are spaced from each other a distance slightly greater than the width of the sound track on the film. Inner drum portion 7 is fixed to the shaft 3 while the outer drum portion 8 is detachably connected with the shaft. This outer end portion has a supporting part or end head 9 formed of transparent material such as glass or quartz to which the peripheral portion is secured, for example, by cement. The end head 9 is constructed to fit snugly over the reduced threaded extension 10 of shaft 3 and is detachably secured thereon by means of the nut 11.

Within the drum is the reflecting member 12, such for example as a mirror set at an angle of approximately 45° with the drum axis whereby light directed into the drum radially through the space between the drum portions will be reflected out through the glass end head in a direction parallel with the shaft. Mirror 12 is supported on the bracket 13 which is shown having an opening through which shaft 3 extends. By suitable well known optical means a portion only of which is shown at 15 a narrow transverse line of light is focused upon the sound record of film 1 which light after traversing the film and being modulated by the sound record is reflected by the mirror 12 into a suitable photo-electric device shown for example at 16. As a result of this construction the photo-electric device may be supported in a stationary manner outside of the drum and may be readily shielded against external influences to the extent found desirable. Inasmuch as the light beam is quite diffused by the time that it reaches the end head 9 the presence of a moderate amount of dust and dirt on the end head has no appreciable effect upon the sound being reproduced. Moreover at the point where the light passes through the sound record on the film, there is nothing to collect dust and dirt save the film itself. It will be understood that the drum illustrated may drive the film or may be driven by the film in accordance with the construction of the machine with which it is used.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Apparatus for reproducing sound from a film record comprising a drum for supporting the record film having axially spaced portions, one of said portions having a transparent end and light reflecting means within the drum.

2. Apparatus for reproducing sound from a film record comprising a drum for supporting the record film having two portions separated by a space adapted to be bridged by the film, one of said portions having a transparent support and a light reflecting member within the drum and opposite said space.

3. Apparatus for reproducing sound from a film record comprising a two part drum for supporting the record film, said parts being spaced axially and one of said parts having a transparent end head, and a light reflecting member within the drum.

4. Apparatus for reproducing sound from a film record comprising a drum having two axially spaced portions adapted to support the record film, one of said portions having a glass end head and a mirror mounted within the drum.

5. Apparatus for reproducing sound from a film record comprising a rotatable shaft, a drum portion fixed thereto, a second drum portion detachably secured to the shaft in spaced relation with the first drum portion and having a transparent supporting part, and a mirror mounted within the drum.

6. Apparatus for reproducing sound from a film record comprising a rotatable shaft, a drum for supporting the record film comprising a portion fixed to the shaft, a second portion spaced from the first portion and having a glass end head detachably secured to the shaft, a mirror within the drum opposite the space between the drum portions and a supporting bracket for the mirror extending through said space.

In witness whereof I have hereunto set my hand.

EDWARD W. KELLOGG.